(12) United States Patent
Leung

(10) Patent No.: US 6,466,580 B1
(45) Date of Patent: Oct. 15, 2002

(54) METHOD AND APPARATUS FOR PROCESSING HIGH AND LOW PRIORITY FRAME DATA TRANSMITTED IN A DATA COMMUNICATION SYSTEM

(75) Inventor: Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/255,707

(22) Filed: Feb. 23, 1999

(51) Int. Cl.[7] .......................... H04L 12/28; H04L 12/56
(52) U.S. Cl. ................ 370/412; 370/395.42; 370/395.7
(58) Field of Search ................................ 370/412, 413, 370/415, 417, 419, 422, 444, 455, 252, 395, 428, 351, 370, 362, 355, 356, 360, 359, 230, 229, 235, 352, 354, 395.42, 395.7, 395.71, 395.72, 400, 401; 340/825.5, 825.03, 825.51, 825.52

(56) References Cited

U.S. PATENT DOCUMENTS

| | | | | |
|---|---|---|---|---|
| 5,126,999 A | * | 6/1992 | Munter et al. ............... | 370/415 |
| 5,515,376 A | | 5/1996 | Murthy et al. ............. | 370/85.13 |
| 5,535,197 A | * | 7/1996 | Cotton ................... | 370/395.72 |
| 5,640,389 A | * | 6/1997 | Masaki et al. ............... | 370/418 |
| 5,774,453 A | * | 6/1998 | Fukano et al. ............... | 370/231 |
| 5,887,134 A | * | 3/1999 | Ebrahim ..................... | 709/200 |
| 5,944,778 A | * | 8/1999 | Takeuchi et al. ............ | 709/100 |
| 5,956,342 A | * | 9/1999 | Manning et al. ............ | 370/414 |
| 6,072,772 A | * | 6/2000 | Charny et al. ............... | 370/229 |
| 6,094,435 A | * | 7/2000 | Hoffman et al. ............. | 370/229 |
| 6,104,700 A | * | 8/2000 | Haddock et al. ............ | 370/414 |
| 6,134,217 A | * | 10/2000 | Stiliadis et al. ............. | 370/232 |
| 6,147,969 A | * | 11/2000 | Benmohamed et al. ..... | 370/230 |
| 6,259,699 B1 | * | 7/2001 | Opalka et al. ............... | 370/389 |
| 6,320,864 B1 | * | 11/2001 | Hebb et al. .................. | 370/412 |
| 6,324,165 B1 | * | 11/2001 | Fan et al. .................... | 370/232 |

* cited by examiner

Primary Examiner—Douglas Olms
Assistant Examiner—Phirin Sam

(57) ABSTRACT

A multiport data communication system for switching data packets between ports includes a plurality of receive ports for receiving data packets, a plurality of transmit ports for transmitting data packets, circuitry deciding whether each received data packet is one of high priority and low priority, and a memory for storing each received data packet. A memory location designator is provided for each data packet indicating where the corresponding data packet is stored in the memory and a plurality of queuing devices corresponding to the plurality of transmit ports queue the memory location designators. Each queuing device has a high priority queue queuing memory location designators corresponding to data packets of high priority to be retrieved from the memory an transmitted by the respective transmit port and a low priority queue queuing memory location designators corresponding to data packets of low priority to be retrieved from the memory and transmitted by the respective transmit port. Transferring circuitry transfers the data packets from the memory to a transmit queue corresponding to each respective transmit port and includes logic circuitry corresponding to each transmit queue. The logic circuitry determines whether the low priority queue of a respective queuing device has a memory location designator for a data packet to be retrieved from the memory and sent to the corresponding transmit queue only when the high priority queue of the respective queuing device is empty of memory location designators.

6 Claims, 7 Drawing Sheets

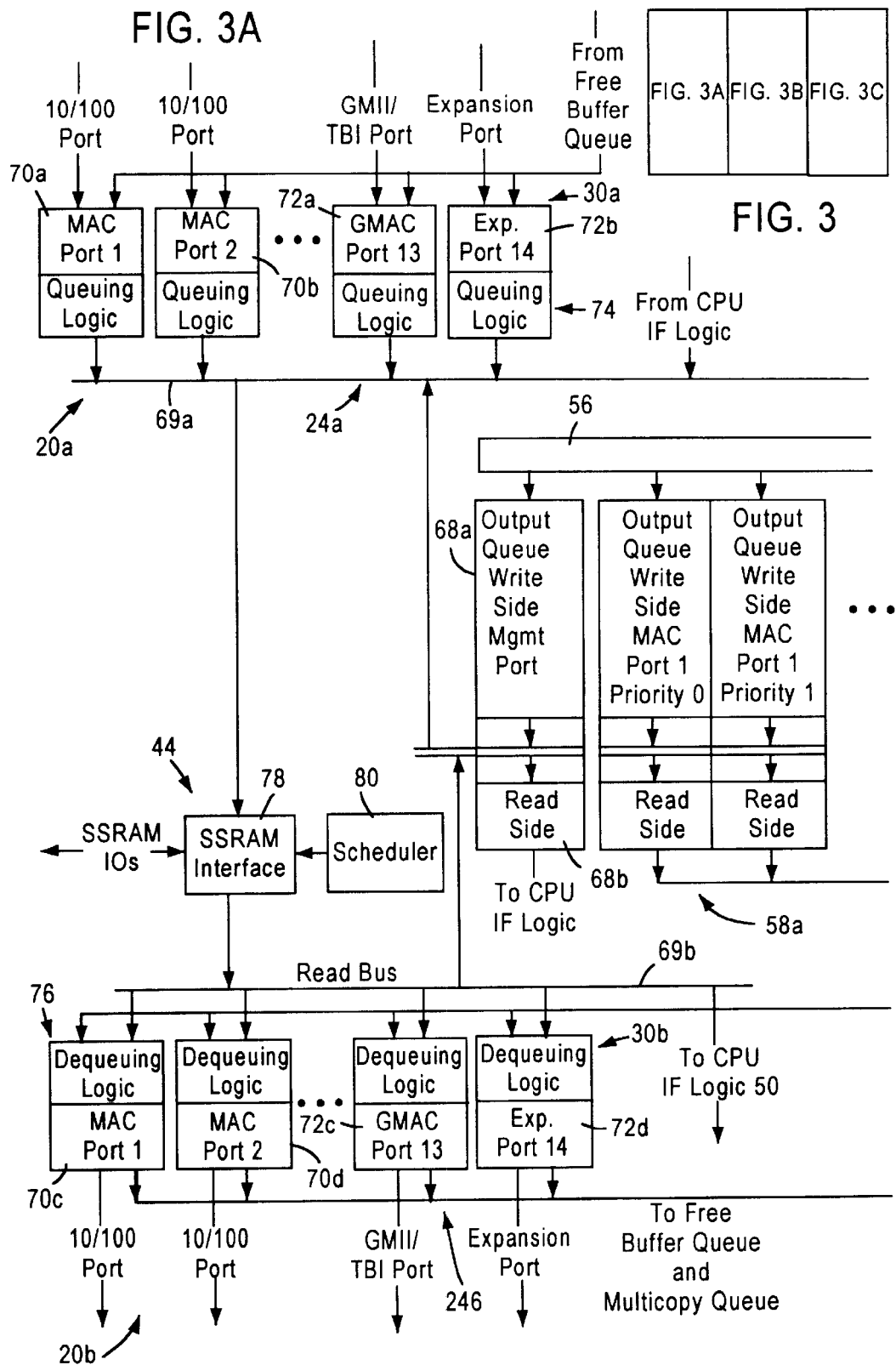

METHOD AND APPARATUS FOR PROCESSING HIGH AND LOW PRIORITY FRAME DATA TRANSMITTED IN A DATA COMMUNICATION SYSTEM

FIELD OF THE INVENTION

This invention relates to data communication systems, and more particularly, to a method and mechanism for processing high and low priority data packets to be transmitted by a communication switch.

BACKGROUND ART

A multiport communication switch may be provided in a data communication network to enable data communication between multiple network stations connected to various ports of the switch. A logical connection may be created between receive ports and transmit ports of the switch to forward received data packets, e.g., frame data, to appropriate destinations. Based on frame headers, a frame forwarding arrangement selectively transfers received frame data to a destination station.

Frame data received at a receive port of the communication switch are transferred to an external memory and subsequently retrieved and transmitted from a respective transmit port of the switch. Some frame data are assigned as high priority data and others are assigned as low priority data. Since all high priority frame data should be transmitted from a respective transmit port before any low priority frame data is transmitted from that port, there is a need to provide a mechanism to assure that this occurs.

DISCLOSURE OF THE INVENTION

The invention provides a novel arrangement for transmitting, from a respective transmit port of a multiport communication switch, all data packets which are of high priority before transmitting any data packet of low priority. The arrangement includes a multiport data communication system for switching data packets between ports and includes a plurality of receive ports for receiving data packets, a plurality of transmit ports for transmitting data packets, circuitry for deciding whether each received data packet is one of high priority and low priority, a memory storing each received data packet, and transferring circuitry transferring, from the memory to a respective transmit port, all data packets of high priority corresponding to the transmit port prior to transferring any data packet of low priority corresponding to the transmit port.

In one aspect of the invention, the transferring circuitry includes a transmit queue for each transmit port and all data packets of high priority are transferred from the memory and placed in the transmit queue for each transmit port prior to any data packet of low priority.

In another aspect of the invention, a memory location designator is provided for each data packet indicating where the corresponding data packet is stored in the memory and a plurality of queuing devices are provided corresponding to the plurality of transmit ports. Each queuing device has a high priority queue queuing memory location designators corresponding to data packets of high priority to be transmitting by the respective transmit port and a low priority queue queuing memory location designators corresponding to data packets of low priority to be transmitting by the respective transmit port.

In still another aspect of the invention, the transferring circuitry further includes logic circuitry corresponding to each transmit queue, the logic circuitry determining whether the low priority queue of a respective queuing device has a memory location designator for a data packet to be retrieved from the memory and sent to the corresponding transmit queue only when the high priority queue of said respective queuing device is empty of memory location designators.

The invention also provides a novel method of processing received data packets for transfer to the plurality of transmit ports of a multiport communication system having a plurality of receive ports for receiving data packets and a plurality of transmit ports for transmitting data packets. The method comprises, for each received data packet, deciding whether each received data packet is one of high priority and low priority, transferring the received data packets to a memory, and for each transmit port, transferring data packets from the memory to each transmit port which are of high priority prior to transferring any data packet from the memory to each transmit port which is of low priority.

The communication system has a plurality of queuing devices and a plurality of transmit queues each corresponding to the plurality of transmit ports, and each queuing device has a high priority queue and a low priority queue. The method further comprises transferring the received data packets to the memory at a location indicated by a memory location indicator, and based on a result of the deciding, storing each memory location indicator in one of the high priority queue and low priority queue corresponding to each transmit port, and for each respective transmit port, transferring from the memory to the corresponding transmit queue all data packets corresponding to memory location indicators in the high priority queue of the respective queuing device prior to transferring from the memory to the corresponding transmit queue any data packet corresponding to a memory location indicator in the low priority queue of the respective queuing device.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
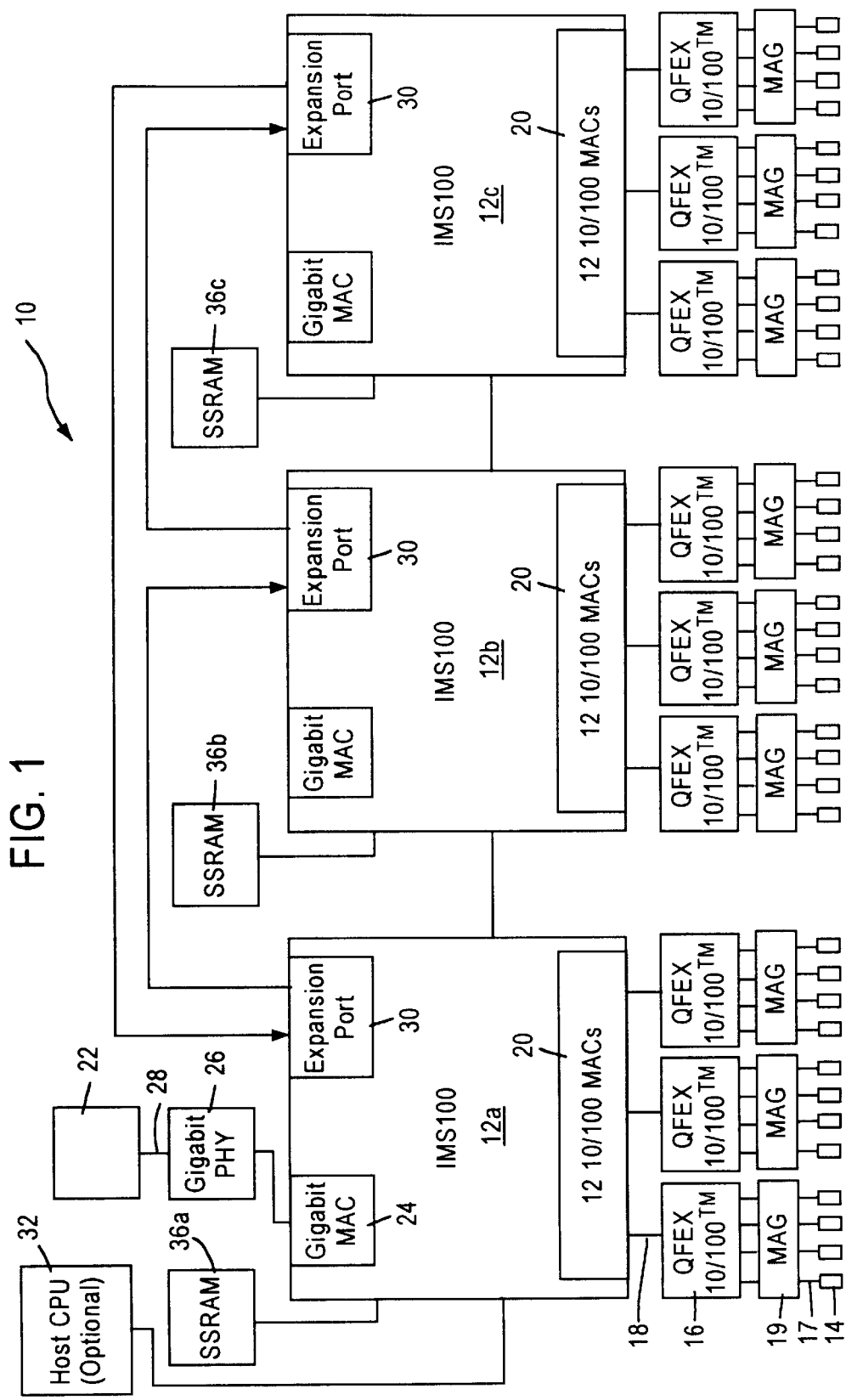
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 (12a–12c) that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802 -3 (ANSI/IEEE Std.802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time, known as the interpacket gap interval (IPG), after the deassertion of a receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 PHY transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
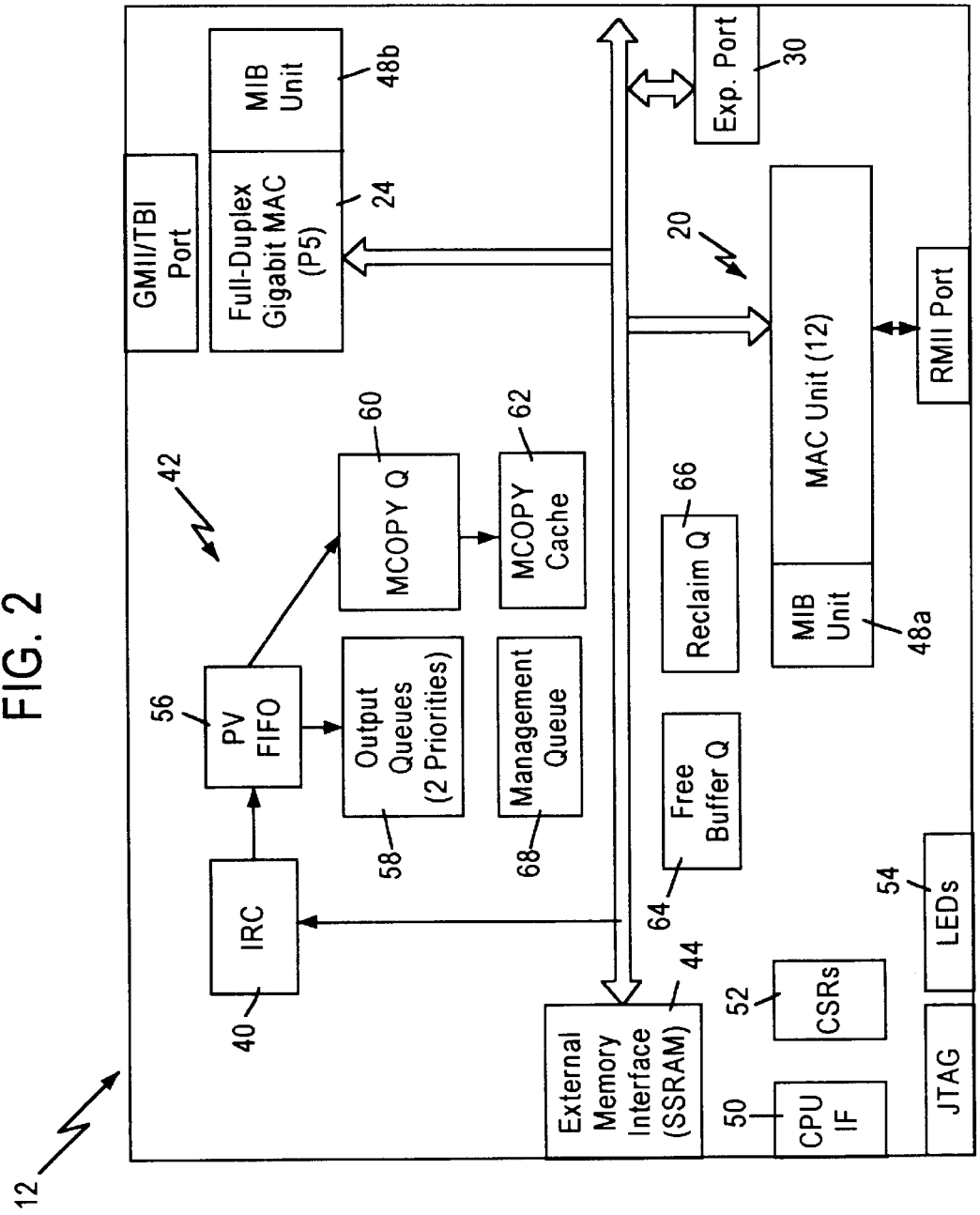
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, a buffer memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the memory 36 for storage of received frame data, memory structures, and MIB counter information. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The External Memory 36 is addressable as upper and lower banks of 128 K in 64-bit words. The size off the external memory 36 is preferably at least 1 Mbytes, with data transfers possible on every clock cycle through pipelining. Additionally, the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source and forwarded to at least one destination station.

The multiport switch 12 also includes an LED interface 54 that clocks out the status of conditions per port and drives external LED logic. The external LED logic drives LED display elements that are humanly readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 using the frame pointer.

The IRC 40 monitors (i.e., "snoops") the data bus to determine the frame pointer value and the header information of the received packet (including source, destination, and VLAN address information). The IRC 40 uses header information to determine which MAC ports will output the data frame stored in the external memory 36 at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN (virtual LAN) tag header that identifies the frame information as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the frame data for transmission (e.g., 10/100 MAC ports 1–12, Gigabit MAC port, and/or Expansion port). The port vector FIFO 56 decodes the forwarding descriptor including the port vector, and supplies the frame pointers to the appropriate output queues 58 that correspond to the output MAC ports to receive the data packet transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68 which can be processed by the host CPU 32 via the CPU interface 50.

The multicopy queue 60 and the multicopy cache 62 keep track of the number of copies of the data frame that are fetched from the respective output queues 58, ensuring that the data packet is not overwritten in the external memory 36 until the appropriate number of copies of the data packet have been output from the external memory 36. Once the number of copies corresponds to the number of ports specified in the port vector FIFO 56, the frame pointer is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
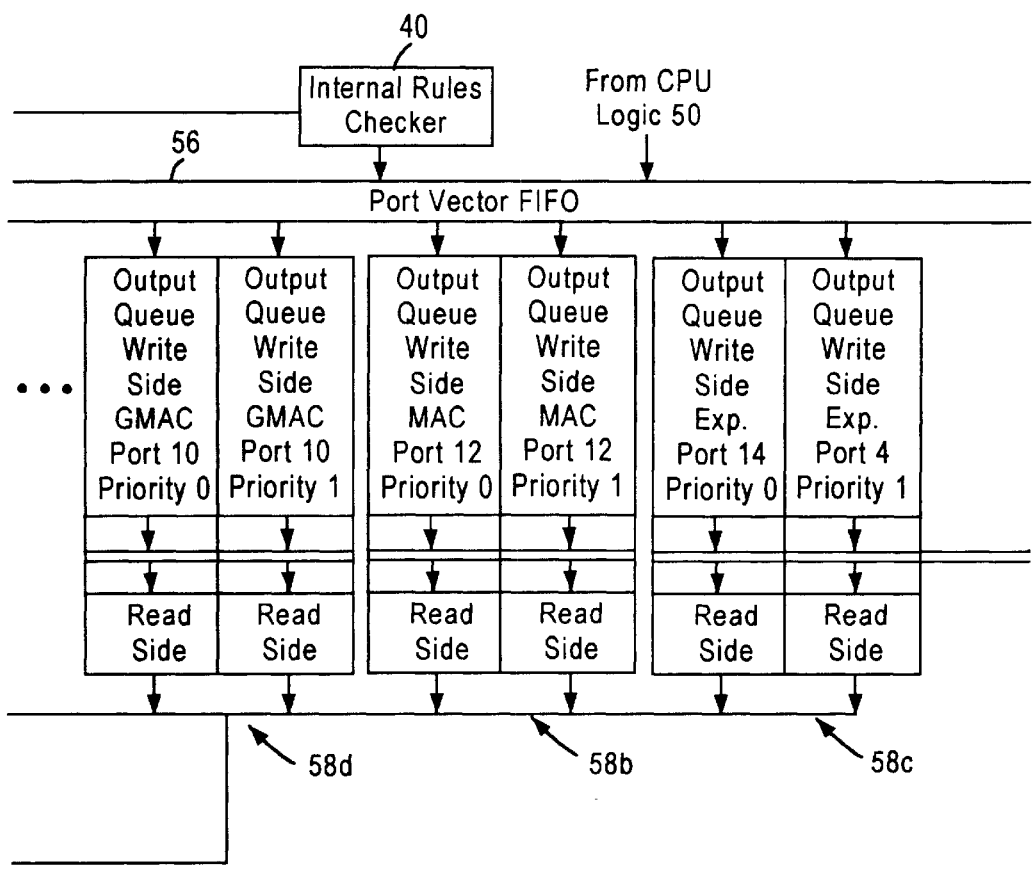
FIG. 3 is a block diagram illustrating in detail the switching subsystem of FIG. 2.
Figure 3C:
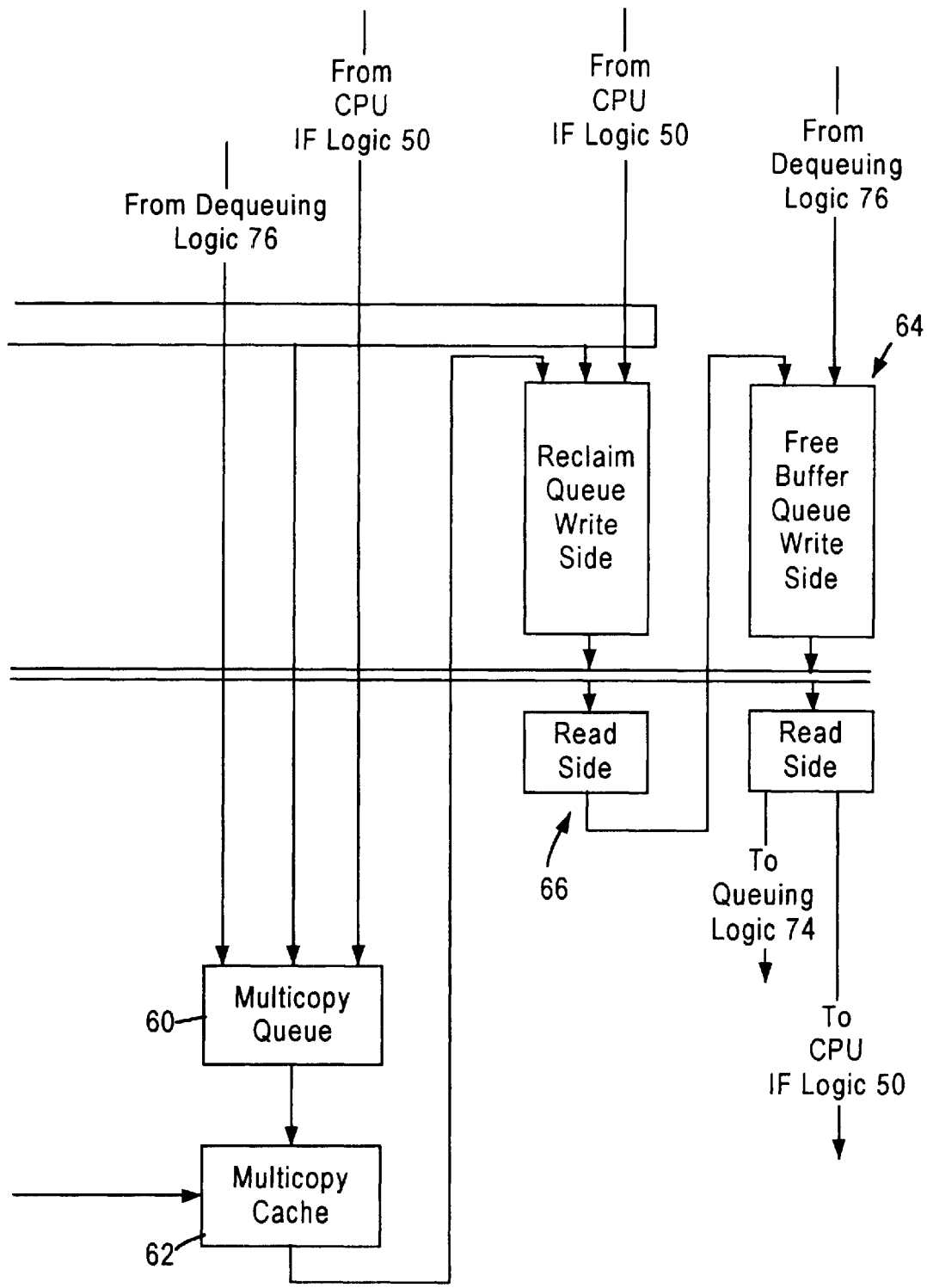

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include 12 MAC modules (only two of each shown and referenced by numerals 70a, 70b, 70c and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72e and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. Therefore, the high priority queue of a respective output queue 58 is always serviced by the corresponding dequeuing logic before the low priority queue of that output queue.

Thus, if the high priority output queue corresponding to the transmit MAC 72c has a frame pointer, the dequeuing logic 76 for the transmit MAC 72c will service this high priority queue before servicing the low priority queue. For example, at some point in time, the frame pointer reaches the bottom of the high priority queue 58 for the transmit MAC 72c. The dequeuing logic 76 for the transmit MAC 72c takes the frame pointer from the high priority output queue 58, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit MAC 72c.

Only when the high priority output queue 58 for the transmit MAC 72c is empty will frame pointer in the low priority output queue 58 for the transmit MAC 72c be processed by the dequeuing logic 76 for the transmit MAC 72c. The processing of frame pointers in the low priority output queue is similar to the processing of the frame pointers in the high priority queue. Each output queue 58 is serviced by the dequeuing logic 76 of the corresponding transmit MAC in a similar manner.

As is clear, each output queue 58 provides transitory storage for the frame pointer that is queued for transmission. There is an output queue block for each port, the expansion port and the management queue. Each output queue block, except for the management queue, is comprised of two queues, one for each of the two priority classes. As noted earlier, the port vector FIFO 56 decodes the forwarding descriptor including the port vector, and supplies the frame pointers to the appropriate output queues 58 that correspond to the output MAC ports to receive the data packet transmission. In other words, the port vector FIFO 56 supplies the frame pointer on a per-port basis.

Figure 4:
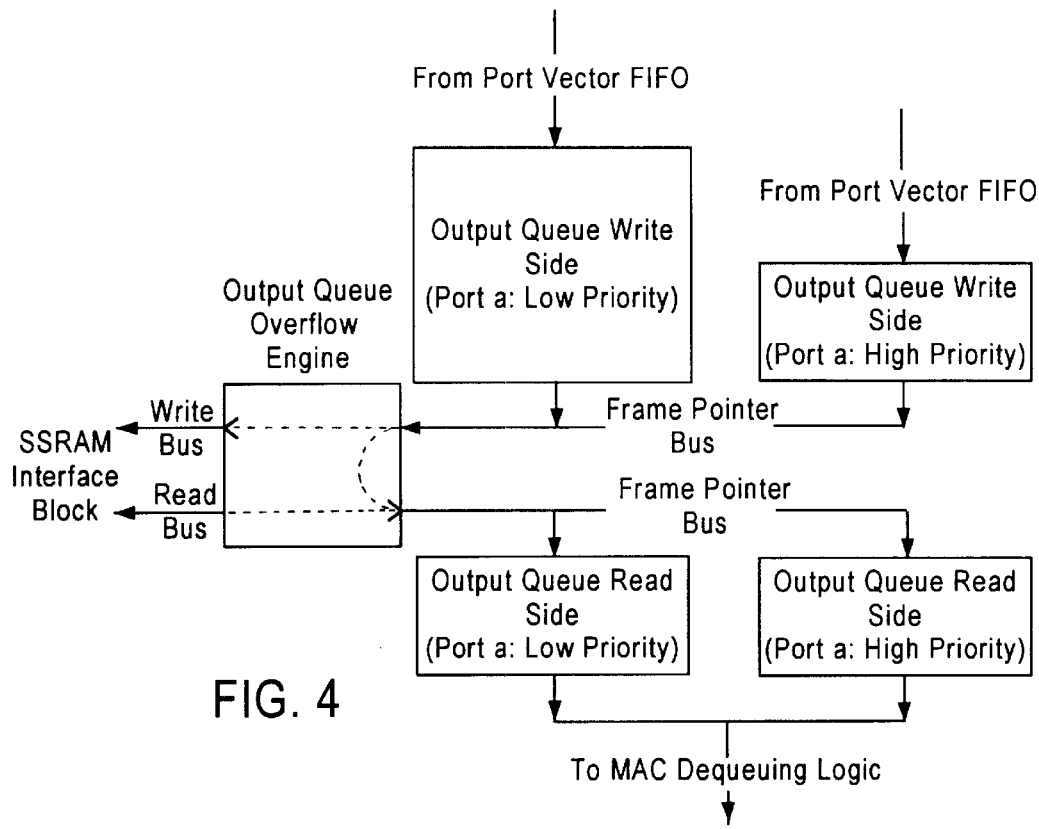
FIG. 4 is a diagram showing the paths through each output queue logic.

Each output queue is comprised of a write side, a read side, and an overflow area as shown in FIG. 4. The write side and read side queues are built into each multiport switch 12 while the overflow area is maintained in the external memory 36. The port vector FIFO logic writes data into the write side of a respective queue and a respective dequeuing logic 76 reads the data from the read side.

When the read side of an output queue overflows, entries are stored in an overflow area in the external memory 36. More specifically, each of the output queues is sized according to the bandwidth of the port it services. However, it is possible that not all entries queued to a given port will fit in the output queue. When entries are written into an empty output queue, they pass directly from the write side to the read side. When the read side is full, additional entries written into the output queue's write side will be placed into the appropriate priority class of the port's output queue overflow in the external memory 36. Once the port's output queue read side and overflow area is full, additional entries placed into the output queue will begin to fill the write side of the output queue. If an attempt is made to write to an output queue when the write side is full, a port output queue overflow interrupt signal for the appropriate port (OVFLx) in a port output queue overflow interrupt register will be set.

Figure 5:
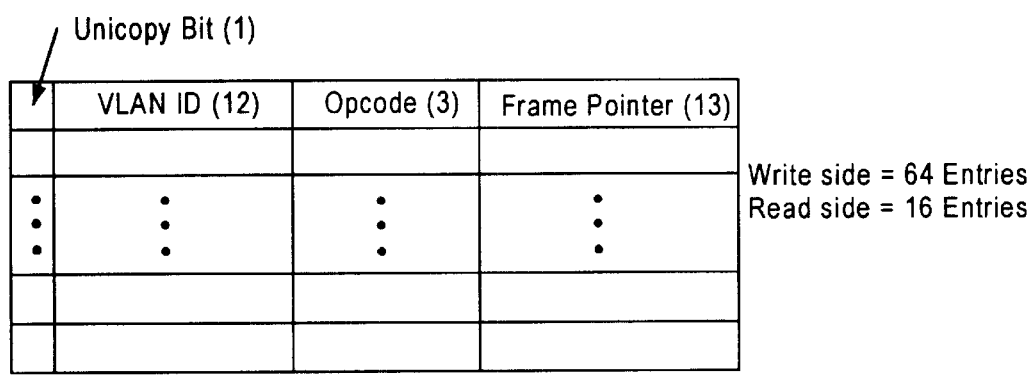
FIG. 5 is block diagram of the data structure of an output queue.

Each output queue data structure is shown in FIG. 5. The write side and read sides hold 64 and 16 entries respectively. Except for the management queue, each entry in an output queue contains the following fields: Frame Pointer, Opcode (control information), VLAN ID (virtual LAN ID), and Unicopy Bit.

If the forwarding descriptor specifies a unicopy transmission (Unicopy Bit), the frame pointer is returned to the free buffer queue 64 following writing the frame data into the transmit FIFO. A multicopy transmission is similar to the unicopy transmission, except that the port vector has multiple bits set, designating the multiple ports from which the frame will be transmitted. The frame pointers is placed into each of the appropriate output queues 58 and retrieved by the dequeuing logic of the appropriate transmit MAC.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

Figure 6:
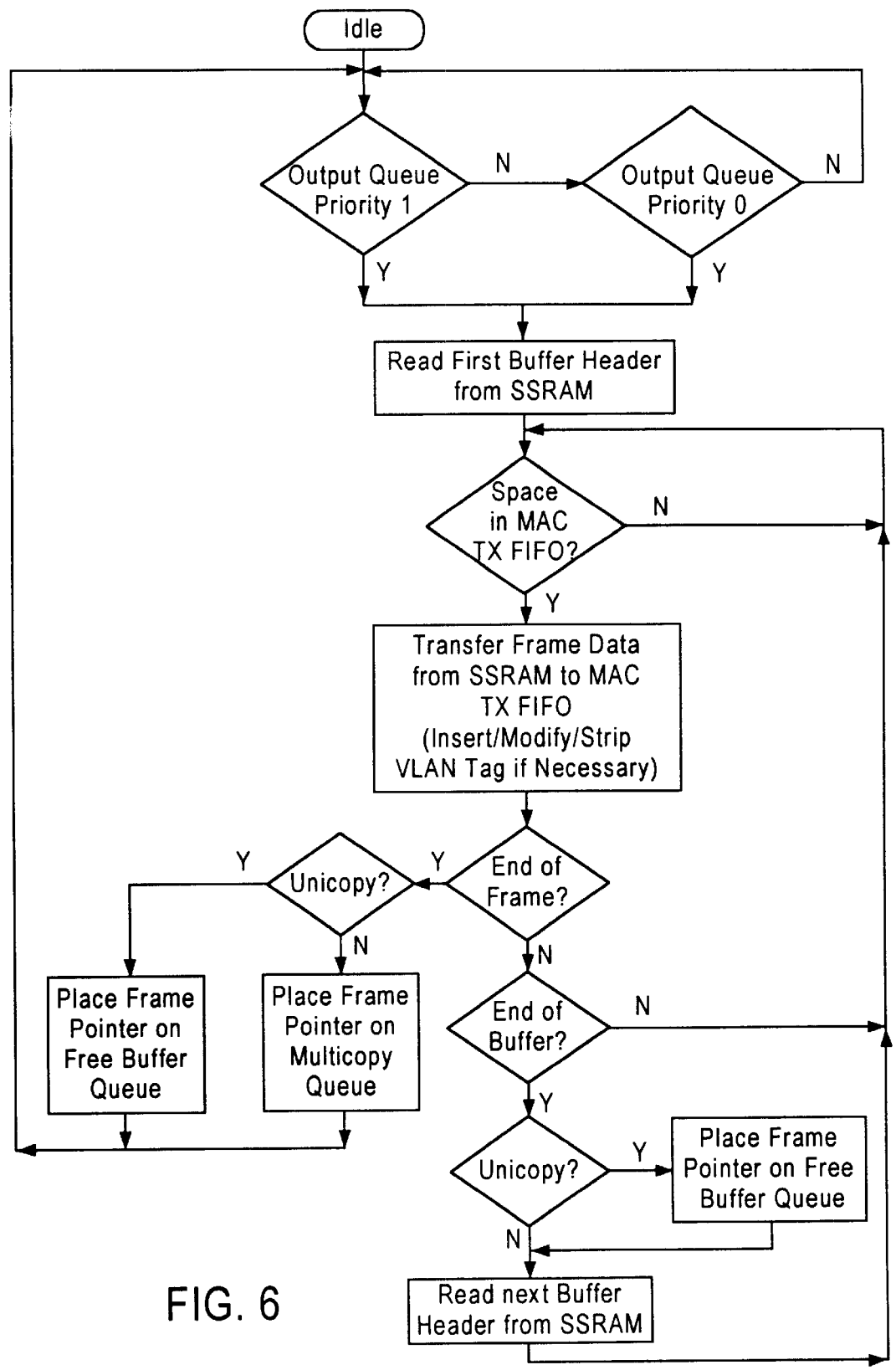
FIG. 6 is a flow diagram of operation of a MAC Dequeuing Logic.

Operation of the MAC dequeuing logic 76 is shown in the flow diagram of FIG. 6. After resetting, the MAC Dequeuing Logic for each port reads frame data and header information from the external memory 36 as follows. The high priority output queue is checked for frame pointers. If there is a frame pointer, the buffer header corresponding to this frame pointer is read from the external memory and determination made as to whether the transmit FIFO has space for the frame data. If space is not available in the transmit FIFO, checking for space continues until space is available. When space is available in the transmit FIFO, the frame data is read from the buffer, and VLAN Tag insertion, stripping, or modification occurs if necessary. Reading the frame data continues until either the end of the frame or end of the buffer occurs. When the frame data is a unicopy (only one copy to be sent), the frame pointer is placed in the free buffer queue making this frame pointer available for further used. When the read buffer is part of a chain of buffers for the frame data, the other buffers are read until the end of the frame is reached. If multiple copies of the frame data are to be sent, the frame pointer is placed in the multicopy queue and the flow returns to the beginning. Only when there is no frame pointer in the high priority queue at the time the respective dequeuing logic is able to read frame data from the external memory will a frame pointer (if available) be read from the low priority queue. Once a frame pointer is read from the low priority queue, the frame data will be read from the external memory and placed in the transmit FIFO in the same manner as the frame data corresponding to the frame pointer read from the high priority queue. Once frame data is in the transmit FIFO, it will be transmitted in the order queued irrespective of the previous priority designation.

Thus, a method and mechanism is provided for transmitting, from a respective transmit port of a multiport communication switch, all frame data which is of high priority before transmitting any frame data of low priority. In this disclosure, there are shown and described only the preferred embodiments of the invention, but it is to be understood that the invention is capable of changes and modifications within the scope of the inventive concept as expressed herein.

What is claimed is:

1. A multiport data communication system for switching data packets between ports, the data communication system comprising:

a plurality of receive ports for receiving data packets;

a plurality of transmit ports for transmitting data packets;

circuitry deciding whether each received data packet is one of high priority and low priority;

a common memory for storing each received data packet, the common memory including an overflow area;

circuitry providing a memory location designator for each data packet indicating where the corresponding data packet is stored in the common memory;

a plurality of queuing devices corresponding to the plurality of transmit ports, each queuing device having a high priority queue queuing memory location designators corresponding to data packets of high priority to be transmitted by the respective transmit port and a low priority queue queuing memory location designators corresponding to data packets of low priority to be transmitted by the respective transmit port, and each high priority queue and low priority queue including a write side and a read side configured to hold a predetermined number of memory location designators; and transferring circuitry transferring the data packets from the common memory to a respective transmit port, the transferring circuitry including a common transmit queue for each transmit port and all data packets of high priority for a respective transmit port being transferred from the common memory and placed in the corresponding transmit queue prior to transferring any data packet of low priority for the respective transmit port, each data packet in each corresponding transmit queue being read from said each corresponding transmit queue without regard as to the priority of said each data packet, wherein when a number of memory location designators held in a respective read side is less than the predetermined number, memory location designators are passed from the corresponding write side to said respective read side of each high priority queue and each low priority queue of each queuing device, and when the number of memory location designators held in said respective read side of either the high priority queue and the low priority queue of said each of the queuing devices is equal to the predetermined number, memory location designators are passed from the corresponding write side to the overflow area of the common memory and then passed from the respective overflow area of the memory to the respective read side of the corresponding queuing device when the number of memory location designators held in the respective read side becomes less than the predetermined number.

2. A multiport data communication system for switching data packets between ports, the data communication system comprising:

a plurality of receive ports for receiving data packets;

a plurality of transmit ports for transmitting data packets;

circuitry deciding whether each received data packet is one of high priority and low priority;

a memory for storing each received data packet, the memory including an overflow area;

transferring circuitry transferring, from the memory to a respective transmit port, all data packets of high priority corresponding to the transmit port prior to transferring any data packet of low priority corresponding to the transmit port;

circuitry providing a memory location designator for each data packet indicating where the corresponding data packet is stored in the memory;

a plurality of queuing devices corresponding to the plurality of transmit ports, each queuing device having a high priority queue queuing memory location designators corresponding to data packets of high priority to be transmitting by the respective transmit port and a low priority queue queuing memory location designators corresponding to data packets of low priority to be transmitting by the respective transmit port;

the overflow area of the memory including a high priority area and a low priority area corresponding to each queuing device; and each high priority queue and low priority queue including a write side and a read side configured to hold a predetermined number of memory location designators, wherein when a number of memory location designators held in the read side of either the high priority queue and the low priority queue of each of the queuing devices is less than the predetermined number, memory location designators are passed from the respective write side to the corresponding read side of the queuing device, when the number of memory location designators held in the read side of either the high priority queue and the low priority queue of said each of the queuing devices is equal to the predetermined number, memory location designators are passed from the write side to the respective priority area of the overflow area of the memory corresponding to the queuing device and memory location designators are passed from the respective overflow area of the memory to the read side of the corresponding queuing device when the number of memory location designators held in the read side of the corresponding queuing device becomes less than the predetermined number, and the transferring circuitry includes a transmit queue for each transmit port and said all data packets of high priority are transferred from the memory and placed in the transmit queue for said each transmit port prior to said any data packet of low priority, and logic circuitry corresponding to each transmit queue, said logic circuitry determining whether the low priority queue of a respective queuing device has a memory location designator for a data packet to be retrieved from the memory and sent to the corresponding transmit queue only when the high priority queue of said respective queuing device is empty of memory location designators.

3. The system of claim 2, wherein the high priority and low priority queues of each queuing device and each transmit queue are FIFO queues, each logic circuitry retrieves memory location designators from the bottom of the high priority and low priority queues of the corresponding queuing device and sends data packets retrieved from the memory to the top of the respective transmit queue, and all data packets queued in the respective transmit queue are transmitted from the transmit port in the order queued.

4. In a communication system having a plurality of receive ports for receiving data packets, a plurality of transmit ports for transmitting data packets with each transmit port including a common transmit queue, circuitry providing a memory location designator for each data packet indicating where the corresponding data packet is stored a common memory having an overflow area, and a plurality of queuing devices corresponding to said plurality of transmit ports, each queuing device having a high priority queue and a low priority queue with each high priority queue and each low priority queue including a write side and a read side configured to hold a predetermined number of memory location designators, a method of processing received data packets for transfer to the plurality of transmit ports comprising:

for each received data packet, deciding whether said each received data packet is one of high priority and low priority;

for each transmit port, transferring data packets from said common memory to the corresponding transmit queue of said each transmit port which are of high priority prior to transferring any data packet from said common memory to the corresponding transmit queue of said each transmit port which is of low priority, and reading each data packet from each corresponding transmit queue without regard as to the priority of said each data packet, wherein when a number of memory location designators held in a respective read side of a corresponding queuing device is less than the predetermined number, memory location designators are passed from the corresponding write side to said respective read side of each high priority queue and each low priority queue of each queuing device, and when the number of memory location designators held in said respective read side of the corresponding queuing device is equal to the predetermined number, memory location designators are passed from the corresponding write side to the overflow area of the common memory and then passed from the overflow area of the memory to the respective read side of the corresponding queuing device when the number of memory location designators held in the respective read side becomes less than the predetermined number.

5. In a communication system having a plurality of receive ports for receiving data packets and a plurality of transmit ports for transmitting data packets, a method of processing received data packets for transfer to the plurality of transmit ports comprising:

for each received data packet, deciding whether said each received data packet is one of high priority and low priority;

transferring the received data packets to a memory, the memory having an overflow area including a high priority area and a low priority area corresponding to each queuing device; and for each transmit port, transferring data packets from said memory to said each transmit port which are of high priority prior to transferring any data packet from said memory to said each transmit port which is of low priority, the communication system further having a plurality of queuing devices and a plurality of transmit queues each corresponding to said plurality of transmit ports, each queuing device having a high priority queue and a low priority queue with each high priority queue and each low priority queue including a write side and a read side configured to hold a predetermined number of memory location designators, and the method further comprising:

transferring the received data packets to the memory at a location indicated by a memory location indicator;

based on a result of said deciding, storing each memory location indicator in the respective read side of one of the high priority queue and low priority queue corresponding to each transmit port;

when a number of memory location designators held in the read side of the high priority queue and the low priority queue of each of the queuing devices is less than the predetermined number, passing memory location designators from the respective write side to the corresponding read side of the queuing device;

when the number of memory location designators held in the read side of the high priority queue and the low priority queue of said each of the queuing devices is equal to the predetermined number, passing memory location designators from the write side to the respective priority area of the overflow area of the memory corresponding to the queuing device and passing memory location designators from the respective overflow area of the memory to the read side of the corresponding queuing device when the number of memory location designators held in the read side of the corresponding queuing device becomes less than the predetermined number;

for each respective transmit port, transferring from said memory to the corresponding transmit queue all data packets corresponding to memory location indicators in the high priority queue of the respective queuing device prior to transferring from said memory to the corresponding transmit queue any data packet corresponding to a memory location indicator in the low priority queue of the respective queuing device; and determining whether the low priority queue of the respective queuing device has a memory location indicator for a data packet to be retrieved from the memory and sent to the corresponding transmit queue only when the high priority queue of said respective queuing device is empty.

6. The method of claim 5, wherein the high priority and low priority queues of each queuing device and each transmit queue are FIFO queues, and said method further comprising:

retrieving memory location indicators from the bottom of the high priorty and low priority queues of the respective queuing device and sending data packets retrieved from the memory to the top of the respective transmit queue; and transmitting all data packets queued in the respective transmit queue from the transmit port in the order queued.

\* \* \* \* \*